United States Patent [19]

Chien et al.

[11] Patent Number: 4,885,752

[45] Date of Patent: Dec. 5, 1989

[54] CRYSTAL MODULATED LASER WITH IMPROVED RESONATOR

[75] Inventors: Kuei-Ru Chien, Cerritos; Kin-Kwok Hui, Monterey Park; H. Dean Stovall, Los Angeles; John H. S. Wang, Rancho Palos Verdes, Calif.; Albert J. Lamm, Fremont, all of Calif.

[73] Assignee: Hughes Aircraft Company, Los Angeles, Calif.

[21] Appl. No.: 174,299

[22] Filed: Mar. 28, 1988

[51] Int. Cl.$^4$ .............................................. H01S 3/00
[52] U.S. Cl. ....................................... 372/33; 372/29; 372/101
[58] Field of Search ...................... 372/33, 41, 26–29, 372/93, 99, 101–103, 105, 108

[56] References Cited

U.S. PATENT DOCUMENTS

| | | | |
|---|---|---|---|
| 3,418,476 | 12/1968 | Müller et al. | 372/108 |
| 3,444,479 | 5/1969 | Harris et al. | 372/28 |
| 3,577,098 | 5/1971 | Winston | 372/33 |
| 3,702,974 | 11/1972 | Koechner et al. | 372/33 |
| 3,774,120 | 11/1973 | Ross | 372/28 |
| 3,973,216 | 8/1976 | Hughes et al. | 372/26 |
| 4,024,466 | 5/1977 | Cremosnik | 372/33 |
| 4,104,598 | 8/1978 | Abrams | 372/99 |
| 4,119,929 | 10/1978 | Shackleford et al. | 372/33 |
| 4,176,327 | 11/1979 | Wayne et al. | 372/105 |
| 4,229,079 | 10/1980 | Wayne et al. | 372/13 |
| 4,314,210 | 2/1982 | Everett | 372/28 |
| 4,498,179 | 2/1985 | Wayne et al. | 372/99 |
| 4,528,668 | 7/1985 | Wayne et al. | 372/26 |
| 4,665,524 | 5/1987 | Cotter | 372/13 |
| 4,666,295 | 5/1987 | Duvall, III et al. | 372/28 |
| 4,761,786 | 8/1988 | Baer | 372/72 |

FOREIGN PATENT DOCUMENTS

| | | | |
|---|---|---|---|
| 4619266 | 4/1968 | Japan | 372/28 |
| 0032785 | 4/1981 | Japan | 372/28 |
| 0195892 | 11/1984 | Japan | 372/41 |
| 8302857 | 8/1983 | PCT Int'l Appl. | 372/93 |

OTHER PUBLICATIONS

Egorov et al.; "Synchronization—Medium"; Sov. Phys. J. (U.S.A.); vol.. 13, No. 8; 08/1970; pp. 997–1001.

Primary Examiner—Frank Gonzalez
Attorney, Agent, or Firm—William J. Streeter; Wanda K. Denson-Low

[57] ABSTRACT

The laser (10) has a crystal modulator (22) located at one end (16) of the laser gain medium (12) opposite the end (14) to which the total reflector or grating (18) is attached. The outcoupler (28) is spaced a predetermined nonzero distance apart from the edge (30) of the crystal (22). The spacing (d) is selected to overcome and compensate for distortions caused by thermal lensing effects in the crystal (22).

14 Claims, 1 Drawing Sheet

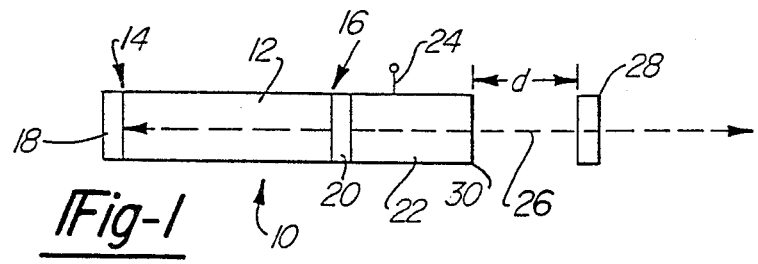
*Fig-1*
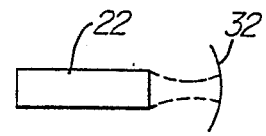
*Fig-2A*
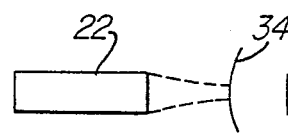
*Fig-2B*
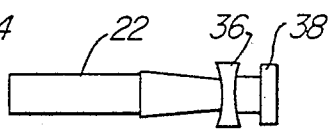
*Fig-2C*
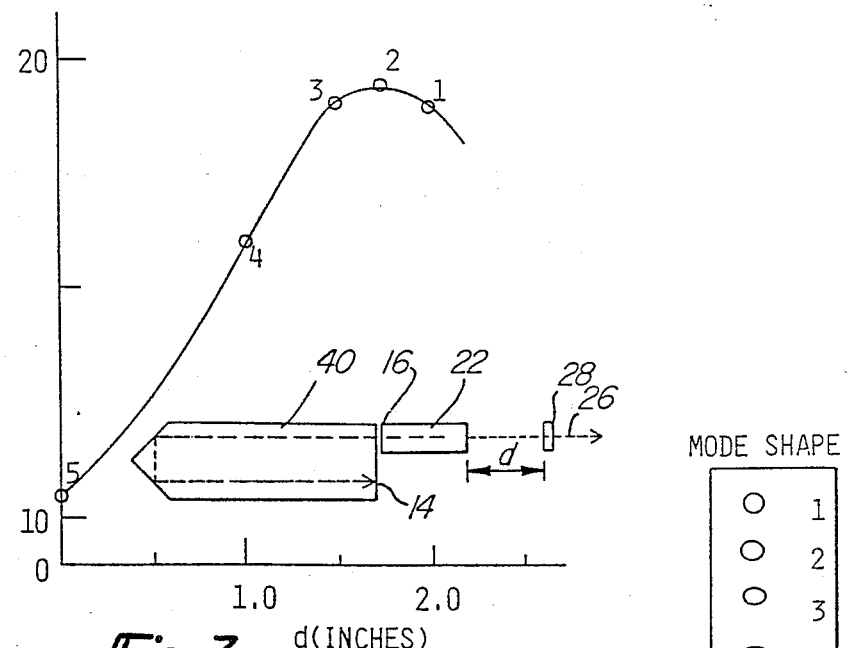
*Fig-3*
*Fig-4*

CRYSTAL MODULATED LASER WITH IMPROVED RESONATOR

BACKGROUND OF THE INVENTION

1. Field of the Invention

The present invention relates generally to crystal modulated lasers. More particularly, the invention relates to a resonator configuration which reduces the insertion loss of the electro-optic crystal modulator by compensating for thermal lensing and other effects.

2. Description of Related Art

Conventional crystal modulated lasers, such as waveguide $CO_2$ lasers, employ an electro-optic crystal positioned directly between the laser gain medium and the outcoupler mirror. The crystal is used to frequency modulate the laser light by applying a periodically changing voltage to the crystal. The periodically changing voltage causes the index of refraction of the crystal to change in synchronism with the modulation voltage. This changes the effective optical length of the laser resonator, causing the frequency of the laser light to be modulated.

In conventional stable resonators, the high intensity laser light quickly heats the crystal causing thermal lensing effects. Thermal lensing results from the fact that the outer periphery of the crystal is in contact or close proximity to a heat removing medium, whereas the center of the crystal is not. This causes uneven heating and a temperature differential is established in the crystal causing the crystal to expand in a nonuniform fashion. The center of the crystal, being hotter, expands more than the outer edges, thereby causing the crystal to take on a lens shape. Thermal lensing is one source of distortion and loss of power in a modulated laser.

Another problem with introducing a crystal modulator in the laser configuration is birefringence. Birefringence is a property of certain crystals characterized by a different index of refraction for different light polarizations. A highly birefringent crystal can rotate light from one polarization to a different polarization, so that the two polarizations interfere with one another and reduce the laser efficiency. Birefringence, thermal lensing and absorption of the laser light by the crystal all contribute to deteriorated laser performance. The introduction of a crystal modulator into the laser cavity thus can reduce the laser power, typically to ½ of its previous value. This limits the practical, compact transmitter laser design to about a 10 watt output level using conventional technology.

Due to the foregoing limitations, imposed by the introduction of crystal modulators into the laser cavity, it has been necessary to resort to bulky and inefficient configurations such as the master oscillator power amplifier (MOPA) in order to achieve high power transmitters.

SUMMARY OF THE INVENTION

The present invention greatly improves laser efficiency by substantially compensating for the thermal lensing effect and by reducing transmitter cavity loss. The resulting laser transmitter can be increased to approximately 20 watts without sacrificing a compact transmitter design.

In accordance with the present invention, the crystal modulated laser has a laser gain medium for producing laser light. The medium has first and second ends. A first reflecting means is positioned generally adjacent the first end and an outcoupler reflecting means is positioned generally adjacent and spaced from the second end. A crystal modulator is positioned generally adjacent the second end, between the second end and the outcoupler reflecting means. The crystal modulator is receptive of laser light and is heated thereby. This heating causes thermal lensing in the crystal modulator. The thermal lensing is compensated for, however, by placing the outcoupler reflecting means spaced apart from the crystal modulator a distance sufficient to substantially compensate for the thermal lensing in the crystal. The distance to achieve the desired compensation is the distance d, given by $$d = \frac{f}{1 + (f/z)^2} - L/2,$$

where
$f \cong (2.1 \times 10^{-4} \times Pc \times L)^{-1}$ cm
$z = 14.5$ cm
L = the length of said crystal modulator in cm
Pc = the intracavity circulating power of said laser light in watts.

If desired, the first reflecting means may comprise a total reflector or a grating. The outcoupler reflecting means may comprise a plane mirror, a concave mirror, a convex mirror, or a combination of lens and reflecting mirror. While placement of the outcoupler reflecting means a distance d from the crystal modulator is presently preferred, the desired result may also be obtained by instead displacing first reflector a distance d spaced from the first end of the laser gain medium. In the alternative, both the first reflector and the outcoupler reflector may be displaced such that the sum of both displacements equals the distance d determined for displacement of the outcoupler reflector alone.

For a more complete understanding of the invention, its objects and advantages, reference may be had to the following specification and to the accompanying drawings.

BRIEF DESCRIPTION OF THE DRAWINGS

FIG. 1 is a diagrammatic side view of the crystal modulated laser of the invention;

FIGS. 2A, 2B and 2C illustrate three different embodiments for retroreflecting the wave back into its original position;

FIG. 3 is a graph depicting output power as a function of outcoupler displacement d; and FIG. 4 illustrates the mode shape of the laser light for the five points plotted in FIG. 3.

DESCRIPTION OF THE PREFERRED EMBODIMENTS

Referring first to FIG. 1, the crystal modulated laser of the invention is illustrated generally at 10. The laser comprises a laser gain medium 12 which may be a length of waveguide or tubing filled with a lasing medium such as $CO_2$. The laser gain medium has first and second ends 14 and 16. A total reflector or grating 18 is positioned adjacent the first end 14. If desired, the reflector 18 may be sealed to the first end 14 to prevent the gaseous lasing medium from escaping. The second end 16 is provided with a window 20 which seals the second end to prevent the lasing medium from escaping. Positioned immediately adjacent the window 20 is an electro-optic crystal 22 which forms the crystal modulator. Crystal 22 may comprise a crystal of CdTe material and has a lead 24 with which to excite the crystal with a modulation signal. Crystal 22 is positioned in the path of the laser light beam 26.

Positioned generally adjacent and spaced from the second end 16 is an outcoupler mirror or reflector 28. The outcoupler mirror 28 is spaced a distance d from the edge 30 of crystal 22. The spacing distance d is selected to substantially compensate for thermal lensing effects in crystal 22. In the case of a $CO_2$ waveguide laser with a CdTe crystal and a plane mirror outcoupler 28, d (in cm) is given by $$d = \frac{f}{1 + (f/z)^2} - L/2,$$

where
$f \approx (2.1 \times 10^{-4} \times Pc \times L)^{-1}$ cm
$z = 14.5$ cm
L = the length of said crystal modulator in cm
Pc = the intracavity circulating power of said laser light in watts.

As an alternative to the flat mirror outcoupler, the invention may be practiced using outcouplers of the configuration illustrated in FIGS. 2A, 2B and 2C. In FIG. 2A the outcoupler is in the form of a concave outcoupler 32. In FIG. 2B the outcoupler is a convex outcoupler 34, while in FIG. 2C the outcoupler is a combination of lens 36 and flat mirror 38.

In operation, the laser gain medium produces laser light which bounces back and forth between reflector 18 and outcoupler mirror 28, each time passing through crystal modulator 22. A portion of the laser light is emitted from the outcoupler mirror in the form of a cohesive laser beam. By controlling the modulation signal on lead 24, the index of refraction of crystal 22 is made to change thereby changing the effective optical length of the light path between reflector 18 and outcoupler mirror 28. This, in turn, changes the frequency of the laser light being emitted.

Due to the placement of crystal 22 in the beam path, the crystal rapidly heats up through absorption of a small portion of the laser energy. Because the outer edges of the crystal are in better thermal contact with a heat dissipating medium such as the mounting structures and/or atmosphere, the outer edges of the crystal tend to be cooler than the center, causing a temperature differential in the crystal. This temperature differential gives rise to thermal lensing effects in which the hotter central part of the crystal expands more than the cooler outer edges causing the crystal to take on a lens shape. As the laser light passes through the lens-shaped crystal, the phase front of the laser beam becomes distorted. This leads to power loss in the resonator and unwanted higher order mode formations are encouraged.

The thermal lensing effect is compensated for, however, by the placement of the outcoupler mirror 28 a distance d from edge 30 of the crystal 22. Placement of the outcoupler mirror spaced from the edge of the crystal reimages the laser beam back to its original phase front. The fundamental mode is thus conserved and waveguide losses are reduced.

The results of the invention are shown in FIGS. 3 and 4. FIGS. 3 and 4 depict a test setup illustrated in FIG. 3 using a folded laser 40 with crystal modulator 22 and flat plane outcoupler reflector 28. Being a folded laser, the first end 14 and second end 16 are positioned side by side, as illustrated.

The results shown in FIG. 3 demonstrate that as the flat outcoupler 28 is moved away from the edge of crystal modulator 22, the laser power Po increases to a maximum at approximately 1.6 inches from the edge of crystal 22. Furthermore, as illustrated in FIG. 4, the mode converges to the fundamental mode as the outcoupler is moved away from the end of the modulator. FIG. 4 illustrates that at positions 1 and 2 on the graph of FIG. 3, the mode shape is circular, the fundamental mode. As the outcoupler is moved closer the crystal 22 (positions 3 and 4) the mode shape begins to take on an eliptical configuration. When the outcoupler is positioned immediately adjacent the crystal according to conventional practice, the mode shape deteriorates significantly as illustrated at 5 in FIG. 4.

While the invention has been described in connection with the presently preferred embodiment, it will be understood that the invention is capable of certain modification and change without departing from the scope of the invention as set forth in the appended claims. For example, while a crystal modulator of CdTe has been illustrated, other crystals, such as GaAs and other modulator structures can be used. Also, while a $CO_2$ waveguide laser has been illustrated, other lasers can also be employed.

What is claimed is:

1. A crystal modulated laser having pumping means for imparting a given amount of energy per unit time into a medium, comprising:

a laser gain medium having first and second ends;

a first reflecting means positioned generally adjacent said first end;

an outcoupler reflecting means positioned generally adjacent and spaced from said second end;

a crystal modulator positioned generally adjacent said second end and between said second end and said outcoupler reflecting means;

said crystal modulator being receptive of laser light and being heated thereby, the heating causing thermal lensing in said crystal modulator; and said outcoupler reflecting means being spaced apart from said crystal modulator by a predetermined distance for substantially compensating for said thermal lensing in said crystal, said predetermined distance being a function of the energy imparted per unit time by said pumping means.

2. The laser of claim 1 wherein said distance is the distance d, given by $$d = \frac{f}{1 + (f/z)^2} - L/2,$$

where
$f \approx (2.1 \times 10^{-4} \times Pc \times L)^{-1}$ cm
$z = 14.5$ cm
L = the length of said crystal modulator in cm
Pc = the intracavity circulating power of said laser light in watts.

3. The laser of claim 1 wherein said crystal modulator comprises a CdTe crystal.

4. The laser of claim 1 wherein said first reflecting means comprises a total reflector.

5. The laser of claim 1 wherein said first reflecting means comprises a grating.

6. The laser of claim 1 wherein said outcoupler reflecting means comprises a plane mirror.

7. The laser of claim 1 wherein said outcoupler reflecting means comprises a concave mirror.

8. The laser of claim 1 wherein said outcoupler reflecting means comprises a convex mirror.

9. The laser of claim 1 wherein said outcoupler reflecting means comprises a lens and reflecting mirror combination.

10. A method of operating a crystal modulated laser having pumping means for imparting a given amount of energy per unit time into a medium, comprising:
   using a laser gain medium to produce laser light;
   placing a total reflector means at one end of said laser gain medium in the path of said laser light;
   placing an outcoupler means at the other end of said laser gain medium in the path of said laser light;
   placing a crystal modulator in the path of said laser light between the total reflector at one end of the laser gain medium and the outcoupler means at the other end of the laser gain medium, said crystal modulator being heated by said laser light, the heating causing thermal lensing in said crystal modulator; and
   adjusting the position of said outcoupler means relative to said crystal modulator by disposing said outcoupler means a predetermined distance spaced from said crystal modulator, said predetermined distance being a function of the energy imparted per unit time by said pumping means to substantially compensate for said thermal lensing in said crystal modulator.

11. The method of claim 10 wherein said distance is the distance d, given by $$d = \frac{f}{1 + (f/z)^2} - L/2,$$

where
   $f \cong (2.1 \times 10^{-4} \times Pc \times L)^{-1}$ cm
   $z = 14.5$ cm
   L = the length of said crystal modulator in cm
   Pc = the intracavity circulating power of said laser light in watts.

12. The method of claim 10 further comprising spacing said total reflector means a second distance from said laser gain medium, said distance and said second distance combined being selected to substantially compensate for said thermal lensing in said crystal.

13. The method of claim 10 wherein the outcoupler is nonflat.

14. The method of claim 10 wherein the outcoupler is in the form of a combined lens and reflecting mirror in the path of said laser light.

* * * * *